Patented May 4, 1937

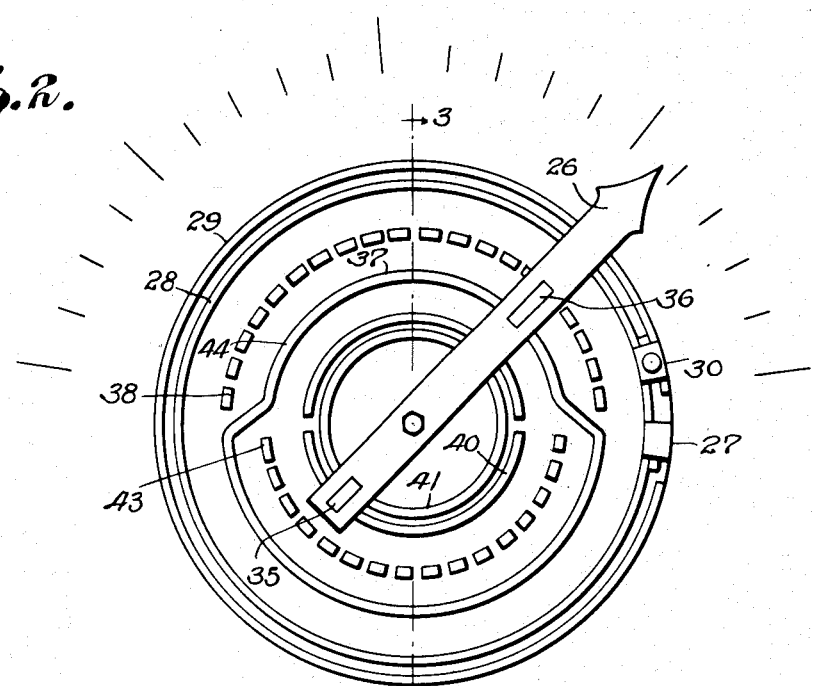
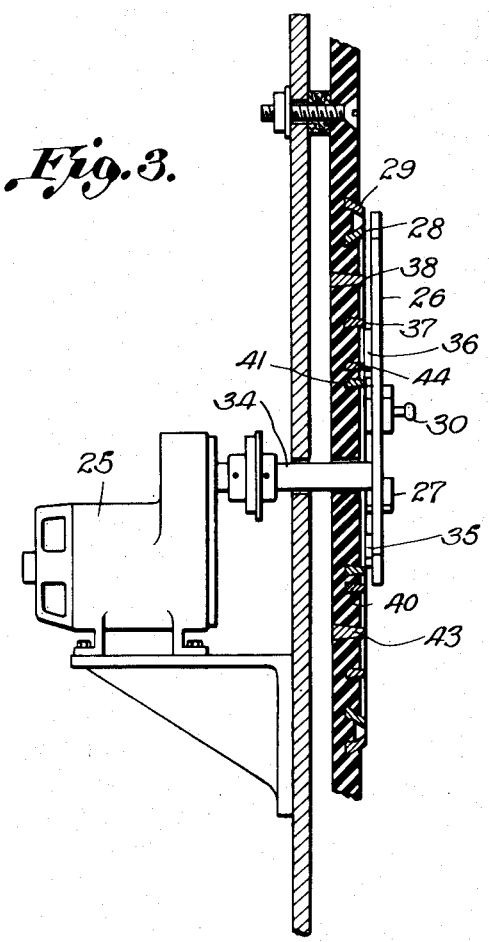
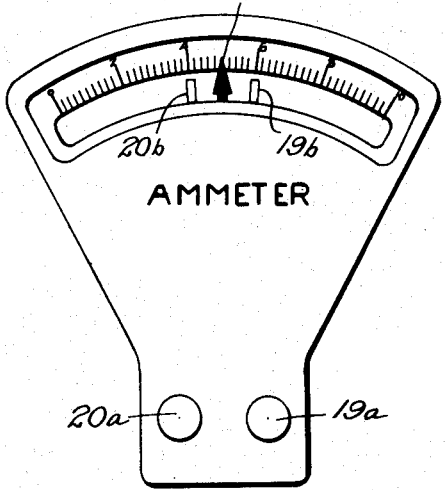

2,079,004

UNITED STATES PATENT OFFICE 2,079,004

METHOD FOR REGULATING THE RATE OF FEED OF A MILLING MACHINE OR OTHER MACHINE TOOL HAVING A PLURALITY OF DRIVING MOTORS

John E. Doran, Cincinnati, Ohio

Application April 10, 1935, Serial No. 15,624

9 Claims. (Cl. 172—239)

This invention is a further development of my copending application, Number 6,715, filed February 15th, 1935.

My invention, while of general application, is particularly applicable to a planer type milling machine, or to other machines where cutters are driven by two or more motors and where the feed is driven by a separate variable speed motor. Throughout the remainder of this disclosure, the invention will be described in that form adapted for application to planer type milling machines.

The principal advantage of my invention is that with a number of cutters at work, each cutter or gang of cutters being driven by a separate motor, the feed can be maintained at that rate which will not overload any of the motors, and which will not put too heavy a duty upon any of the cutters. In case the feed is less than that proper for the work being done by the cutter or the motor which is least able to withstand the load, the feed will be speeded up until the maximum load which can be absorbed by that cutter or motor is reached. Accordingly, I drive the feed mechanism by means of an adjustable speed motor operating through reduction gearing of any desired ratio.

For each of the motors driving a cutter, or gang of cutters, I provide a wattmeter or ammeter for indicating the power input of that motor. Motors for driving cutters are commonly called spindle motors. This wattmeter or ammeter not only indicates the power taken by the particular spindle motor to which it is connected, but is also adapted to operate control mechanism adapted to increase or to reduce the speed of the feed motor. The number of wattmeters or ammeters employed is preferably equal to the number of spindle motors. Each wattmeter or ammeter is of the contact making type, having a moving contact positioned by the power or the current input of the motor to which it is connected, and two adjustable contacts, one connected with a relay for increasing the speed of the feed motor, and the other connected with the contactor for decreasing the speed of the feed motor. The position of the adjustable contacts of each instrument may be independently adjusted, so that one instrument may be set for a relatively great power or current input, while the contacts of another may be set for a relatively small power or current input. The relays for increasing the speed of the feed motor are connected in series, so that all of them must be energized before the contactor to which they are connected becomes energized. A single contactor for diminishing the speed of the feed motor is connected to all of the corresponding instrument contacts, so that if any of them is touched because the power taken by the motor is too great, the feed will be reduced.

This enables the operator to adjust the contacts of each instrument at the proper power range for its associated motor or for the most fragile cutter driven by its motor, and then the feed motor will operate automatically at that speed which is proper for the spindle motor or cutter which is carrying the greatest proportional load. When a fragile cutter is cutting, it will determine the maximum rate of feed, but if this cutter does not happen to be cutting, some more rugged cutter, or one of the motors carrying the largest percent of its rated load, will determine the rate of feed. Thus, the machine will always be caused to operate at the highest rate of feed which is suitable for the conditions under which it is operating at the moment.

Other advantages and improvements will appear in the disclosure.

In the drawings, Figure 1 is a wiring diagram showing the connections which actuate the feed motor in accordance with the power taken by the spindle motors.

Figure 2 is a front view of the rheostat which regulates the speed of the feed motor.

Figure 3 is a vertical section on line 3—3 of the rheostat, in order to show how the rheostat is actuated by the gear motor.

Figure 4 is a front view of the ammeter.

Figure 1:
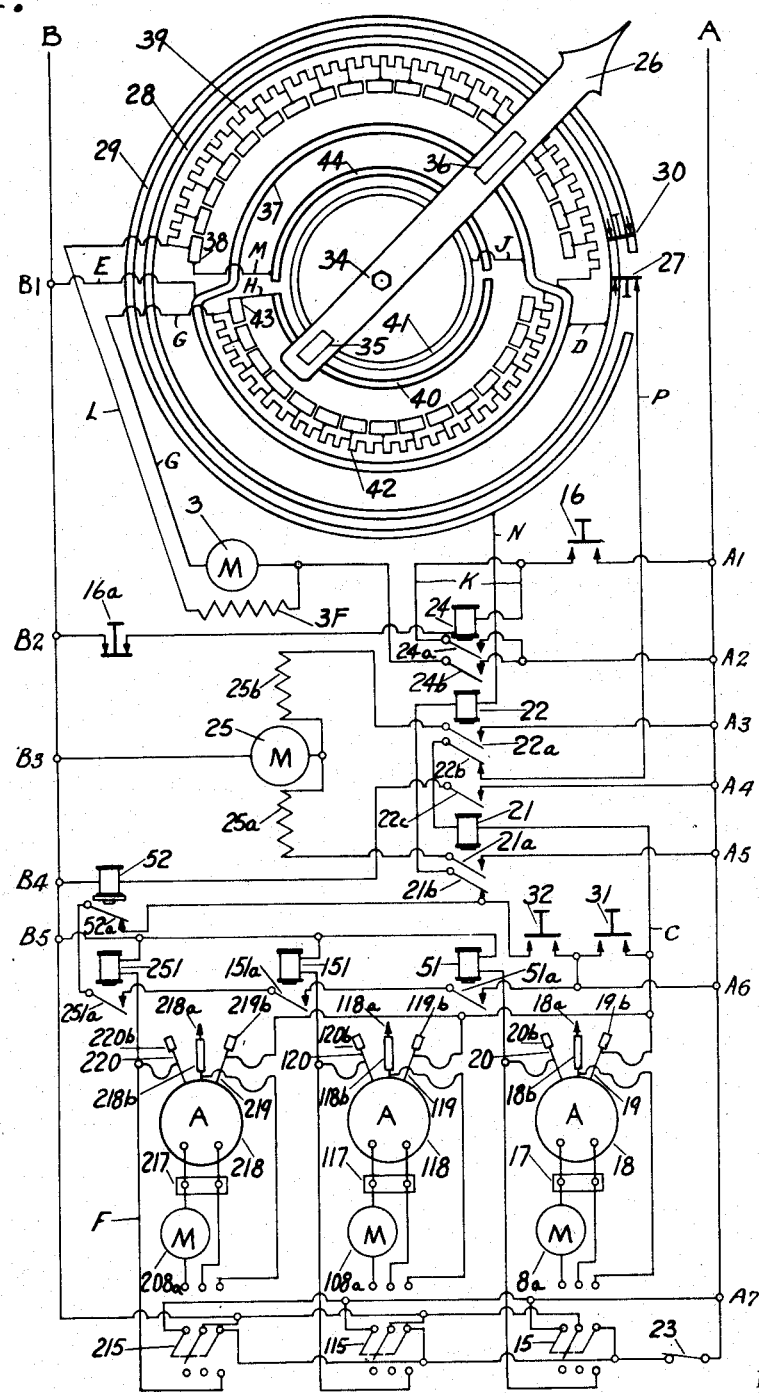

Referring to the drawings, 3 is the armature of an auxiliary motor, commonly termed a feed motor which drives the feed mechanism of the machine. It is not deemed necessary to illustrate the machine or feed mechanism since these are already well known in the art.

Motors 8—a, 108—a, and 208—a are spindle motors which serve to drive milling cutters. It will be understood that as many of these motors as are desired may be used. The motors shown are direct current motors, and the circuits shown are proper for direct current motors. However, alternating current motors may be used, and anyone skilled in the art may readily arrange equivalent circuits suitable for use with alternating current motors. The motors are supplied with power from lines A and B. Each motor is supplied with armature current through a switch 15, 115, or 215, which, for reasons which will appear later, is, in the particular case chosen for illustration, a double throw triple pole switch.

The left hand hinge of each switch is connected to line A by the cross line which runs to the left from A—7, and the center hinge of each switch is connected to line B in the manner shown. When one of these switches, as for instance 15, is closed in the upper position, a circuit is completed from line A through the left hand hinge, blade, and upper jaw of the switch, through the armature of motor M, through shunt 17, back through the upper center jaw of the switch, through the center blade to the center hinge, and thence to line B. The field circuit of the motor is not shown since it is not necessary to the theory of the invention.

The opening of switch 23 renders the automatic control devices inoperative, and enables the operator to control the speed of feed motor 3 by the use of push buttons 31 and 32 in the manner described later.

In the armature circuits of the three motors are three shunts 17, 117, and 217. The terminals of the shunts are connected to the terminals of three ammeters 18, 118, and 218. Either ammeters or wattmeters may be employed for the purpose of measuring the power input of the motors, ammeters giving an approximate measurement, while wattmeters give an exact measurement. However, under most circumstances, an ammeter is sufficiently exact to give proper results, and ammeters are therefore shown in the drawings.

Each ammeter is provided with a moving element, preferably a needle 18—a, 118—a, or 218—a, whose position is determined by the current passing through the armature of the motor, to the shunt of which the ammeter is connected. The needle moves to the right as the current increases, and to the left as the current diminishes. On each moving element is a contact 18—b, 118—b, or 218—b. The contact 18—b may be electrically connected to the right hand upper jaw of switch 15, thence through the right hand blade to the right hand hinge, and thence through switch 23 to line A. The other contacts 118—b and 218—b may be similarly connected to line A, through the right hand blades of switches 115 and 215.

It will be seen from the drawings and above description that when any of the motors is energized by the closing of its switch, the contact on the needle of its ammeter is also energized from line A, provided switch 23 is closed. If one of the spindle motors is deenergized by closing its switch in the lower position, as for example, switch 15, the lower right jaw of the switch is energized from line A through switch 23 and the right hand hinge and blade of switch 15. The lower center and left jaws of switches 15, 115 and 215 are not connected to any circuit and have no function. The lower right hand jaw of switch 15 is connected to relay 51 which is thus connected by the right hand blade of switch 15 to line A. Switches 115 and 215 act similarly. It will thus be seen that each of the relays 51, 151 and 251 is energized from line A when its associated motor 8—a, 108—a, or 208—a is deenergized. Consider motor 8—a and ammeter 18 with the switch 15 in the position to energize the motor and the contact 18—b of the ammeter. On one side of the needle 18—a is contact 19—b and on the other side is contact 20—b, whose positions may be adjusted by means described later. 19—b is connected with contactor 21 by line C so that when contact 18—b touches contact 19—b, contactor 21 will be energized.

3 is an adjustable speed motor which drives a feed mechanism, and 3—f is the field of this motor. Motor 3 is provided with means for speed adjustment which may be of any appropriate type, but the means described and illustrated are a motor operated rheostat. 26 is a rheostat arm, carrying contact brushes 35 and 36, which make contacts with contact points and rings on the rheostat to which the armature and field of motor 3 are connected. 25 is a gearmotor which is attached to arm 26 and serves to revolve it in either direction according as field 25—a or 25—b is energized. If it is desired to use the invention for other purposes, gearmotor 25 may serve to actuate any sort of member which it is desired to move for any useful purpose. Motor 25 is a series motor, having two fields wound in such ways as to produce opposite magneto-motive forces. 21 is a contactor which when energized closes contacts 21—a and opens contacts 21—b. The closing of contacts 21—a energizes motor 25 through field 25—a, the circuit running from A5 through contact 21—a, series field 25—a and the armature of 25 to the connection B3, causing it to revolve the rheostat arm 26 in such a direction as to reduce the speed of motor 3.

22 is a contactor which, when energized, closes contacts 22—a and 22—c and opens contacts 22—b. Closing contacts 22—a energizes motor 25 through field 25—b, the circuit being from A3 through contact 22—a, through series field 25—b, and the armature of motor 25 to B3, and causes it and rheostat arm 26 to revolve in such a direction as to increase the speed of motor 3.

It is desirable that when the power taken by any one of the spindle motors 8—a, 108—a or 208—a is too great, the feed shall be promptly reduced. On the other hand, if the power taken by all of these motors which happen to be energized by the closing of their respective switches 15, 115, or 215, falls off to the point where it is desirable to increase the feed, the feed should be increased gradually, so that the feed shall not suddenly become too great. In other words, it is desirable to move arm 26 rapidly in one direction and slowly in the other. Accordingly, I provide means for interrupting the current through motor 25 when contactor 22 is energized, in the following manner.

When contactor 22 is energized, thus closing contacts 22—c, contactor 52 will be energized from A4 to contacts 22—c through the coil 52 to B4, thus connecting lines A and B, which will open contacts 52—a. The opening of contacts 52—a deenergizes contactor 22 because it interrupts the circuit which is established from A6 through closed contacts 51—a, 151—a, 251—a, 52—a, 21—b, the coil of contactor 22, line N, the rheostat ring 29, the normally closed button 30, the rheostat ring 28, connection D, the rheostat ring 37 and connection E to B1, thus allowing contacts 22—a and 22—c to open, deenergizing both motor 25 and contactor 52. Motor 25 is deenergized because of the opening of contacts 22—a, through the circuit already described. Contactor 52 is deenergized because of the opening of contacts 22—c, through the circuit already described. Contactor 52, however, does not close immediately since it is of a type in which the flux decays slowly. By adjusting the tension of the spring which closes the contacts, the time interval between the deenergizing of the coil and the closing of the contacts can be varied in a manner already well known in the art. Accordingly, contacts 52—a are delayed in their closing, and contactor 22 is deenergized for a longer time interval than the interval during which it was previously energized. Consequently, although contactor 21 acts continually to energize motor 25 so long as the circuit between 21 and line A is uninterrupted, contactor 22 acts only for an instant to energize motor 25 when the circuit between 22 and line A is uninterrupted. The elements which move the needles of the ammeters are arranged in the manner usual in the art, so that the indications of the needles are approximately determined by the power inputs of the associated motors, the needles moving further to the right as the power inputs increase.

The ammeter which I use has elements additional to those usually used in ammeters, in order that the indication of the ammeter may be used to control the rate of feed.

On the needle of the ammeter, and insulated from the remainder of the mechanism, is a double faced contact 18—b. To the right of the needle is an arm 19 which can be turned about a point at or near the pivot of the ammeter needle by means of knob 19—a. On the arm is contact 19—b which is capable of making contact with contact 18—b on the ammeter needle 18—a when it has moved sufficiently to the right.

To the left of the ammeter needle is arm 20 which is turned about a point at or near the pivot of the needle by knob 20—a, and carries contact 20—b which is also capable of making contact with the contact 18—b on the needle when the needle moves sufficiently to the left. The angular positions of arms 19 and 20 may be adjusted manually so the ammeter needle 18 will always lie between any desired limits, the difference between its extreme positions being large or small, according to the adjustment.

As already explained, the needle contact 18b is connected to line A in the manner shown diagrammatically in Figure 1, through the switch 23, the opening of which makes the device inoperative.

The feed motor 3 is supplied with field current and also with armature current through a rheostat shown diagrammatically in Figure 1, which is operated by a gearmotor 25. Gearmotor 25 is a series motor having a split field. One part of the field causes the armature to revolve in one direction and the other part of the field causes the armature to revolve in the other direction. The output shaft 34 of the gearmotor, which rotates at a relatively slow rate of speed, such as one revolution in ten seconds, is attached to the handle 26 of the rheostat for the purpose of turning it. The rheostat connections are arranged in such a way that as 26 rotates through one semi-circumference of the rheostat, it increases or diminishes the field current of the feed motor, while the armature voltage remains at its maximum, and as it rotates through the other semi-circumference of the rheostat it diminishes or increases the armature voltage of the feed motor, while the field current remains at its maximum. By this means, any reasonable speed, as for instance from 450 to 1800 R. P. M., may be obtained by field control of the feed motor, and lower speeds, as for instance between 200 and 450 R. P. M., by armature control of the feed motor.

Referring to the feed motor 3 and the controlling rheostat with handle 26, the direction of rotation of the gearmotor is made such that when field 25a is energized, its shaft 34 turns handle 26 in a clockwise direction, which increases the speed of feed motor 3. When field 25b is energized, handle 26 turns in a counter clockwise direction, which reduces the speed of feed motor 3. The connections between the motor and the rheostat are as follows:

With handle 26 in the position shown, the armature of motor 3 is energized from A2 through contact 24b, the armature of motor 3, line G, rheostat contact 43, connection H, rheostat ring 40, rheostat brush 35, rheostat ring 41, connection J, rheostat ring 37, and connection E, to B1. Contacts 24b are closed, starting motor 3, when contactor 24 is energized by momentarily pressing button 16, which closes a circuit from A1 through button 16, through the coil of 24, through normally closed button 16a, to B2. The closing of contacts 24a, which occurs when 24 is energized, closes a holding circuit from A2 through contacts 24a, through line K, through the coil of 24, and through normally closed button 16a, to B2. 24a and 24b then remain closed until button 16a is pressed, which opens the holding circuit and allows contactor 24 to open, stopping motor 3.

The field 3F of motor 3 is energized from A2 through contacts 24b to the field of motor 3, thence through line L to rheostat contact 38. From rheostat contact 38, the current flows through successive resistances 39 until it reaches one of the rheostat contacts touching the brush 36, thence to rheostat ring 37, which is connected by line E to B1. It will be seen that if handle 26 revolves clockwise, the resistance in the circuit of field 3F will be increased, and motor 3 will run faster, giving a faster feed. If it is revolved counterclockwise, the resistance in the circuit of the field 3F will be diminished until handle 26 is in a horizontal position, pointing to the left, when all of the resistance in the field circuit will be cut out.

If the handle continues to revolve in a counterclockwise direction, brush 35 will pass from segment 40 to segment 44, and brush 36 will pass from field resistance contacts 38 to armature resistance contacts 43. The field circuit will then be completed from A2, through 24b, through 3F, line L, field resistance contact 38, line M, rheostat segment 44, brush 35, rheostat ring 41, line J, rheostat ring 37, and line E, to B1. The armature circuit will be completed from A2, through 24b, armature 3, line G, armature rheostat contact 43, a series of armature rheostat resistances 42, a second armature rheostat contact, brush 36, rheostat ring 37, and line E, to B1. As 26 continues to revolve in a counterclockwise direction, more and more of the armature resistance 42 will be placed in the armature circuit, the field resistance remaining at its minimum, and motor 3 will run more and more slowly.

On a pair of conducting rings 28 and 29 is mounted an adjustable limit switch 30 which can be moved about shaft 34 in contact with rings 28 and 29, and which will be touched by the handle 26 of the rheostat whenever the latter has moved sufficiently in a clockwise direction. This limit switch 30 is adjusted by the operator for whatever maximum feed may be suitable for the work in hand. The position of switch 30 determines the maximum rate of feed at which the machine will operate. This limit switch 30 is opened whenever the rheostat handle presses the button, and so opens the circuit through contactor 22.

The method by which this limit switch 30 functions is as follows:

The circuit from B1 through line E, conducting rheostat ring 37, connection D, rheostat ring 28, runs through button 30, thence through rheostat ring 29 thence through line N, the coil of contactor 22, to contact 21b, to contact 52a, to contact 251a, to contact 151a, to contact 51a and thence to A6. Since opening switch 30 breaks this circuit, 22 will be deenergized. The opening of contacts 22a deenergizes motor 25 and field coil 25b. The motor will therefore no longer rotate handle 26 in a clockwise direction.

Button 27 is a fixed push button, which, when handle 26 has revolved in a counterclockwise direction to its limiting position, is opened by the handle. This opens the circuit running from B1 through line E rheostat ring 37, connection D, normally closed button 27, line P, contact 22b the coil of relay 21, line C to contacts 19b, 119b and 219b which are in parallel, and are energized from line A in the manner which has already been described. If button 27 is opened, breaking this circuit will deenergize relay 21, opening contact 21a, deenergizing motor 25 and field coil 25a which stops the movement of the handle in the counterclockwise direction.

When automatic operation is not desired, switch 23 is opened, deenergizing the left hand hinges, blades and jaws of each of the switches, and thereby making it impossible to energize relays 51, 151, and 251 and also impossible to energize relay 21. Since relays 51, 151 and 251 cannot be energized, contactor 22 cannot be energized. Hence motor 25 cannot be energized. In order to change the feed, which involves the changing of the speed of motor 3, buttons number 31 and 32 are now used. If it is desired to reduce the feed, button 31 is pressed, completing a connection from A6 through line C, the coil of relay 21, normally closed contacts 22b, and line P, to button 27 and thence as previously described. If button 27 is already opened, because of the position of handle 26, the circuit will not be completed and hence relay 21 will not be energized. If relay 21 is energized, the circuit through the field 25a of motor 25 is completed, and handle 26 will revolve clockwise as long as button 31 is pressed.

If it is desired to increase the feed, button 32 is pressed, completing a circuit from A6 through button 32, normally closed contacts 21b, the coil of contactor 22, and line N, to ring 29, to button 30. If button 30 is closed, the remainder of the circuit to B1 will be completed as previously described, contactor 22 will be energized, energizing motor 25 through field coil 25b as previously described. This will cause handle 26 to move in a clockwise direction. If, however, button 30 is open because of the position of handle 26, the circuit through contactor 22 will not be completed and motor 25 will not be energized.

Contacts 21b and 22b are safety contacts which prevent the simultaneous energization of relay 21 and contactor 22, which would result in energizing motor 25 through both fields, thus causing a short circuit. If relay 21 is energized, it is impossible to energize coil 22. Conversely if contactor 22 is energized, it is impossible to energize coil 21.

When the current in any one of the motors 8—a, 108—a, or 208—a reaches the maximum value for which the contact elements of its associated ammeter are set, the needle of that ammeter will move to the right sufficiently to touch contact 19b, 119b, or 219b, as the case may be. In doing so, it energizes contactor 21, closing contacts 21—a and opening contacts 21—b. When contacts 21b open, the circuit previously existing from A6 through contacts 51a, 151a, 251a, 52a, 21b, the coil of 22, the rheostat ring 29, the normally closed button 30, the rheostat ring 28, connection D, rheostat ring 37, and connection E, to B1 is interrupted. This makes it impossible to then energize contactor 22. The closing of the contacts 21a establishes a circuit from A5 through 21a, series field 25a, and the armature of motor 25, to B3, which energizes motor 25 through field 25—a, causing the rheostat arm 26 to move in such a direction as to reduce the speed of motor 3, either by strengthening its field or by reducing the voltage of the armature current, or by doing both.

Let us assume that switches 15 and 115 are in position to energize motors 8—a and 108—a and that switch 215 is in the lower position. In such a case, relay 251 is energized from line A, through switch 23, the right-hand blade and lower jaw of switch 215, through line F, through the coil of switch 251, and thence to B5, thus closing contacts 251—a. If now motors 8—a and 108—a are both taking less current than the contacts 20—b and 120—b have been set for, the ammeter needles will move to the left, contact 18—b will touch contact 20—b, energizing relay 51, and contact 118—b will touch contact 120—b, energizing relay 151. Contacts 51—a and 151—a will thus be closed, and since contacts 251—a are already closed, a circuit will be formed from line A through contacts 51—a, 151—a, 251—a, 52—a and 21—b to energize contactor 22, which in turn energizes motor 25 through field 25—b as has already been explained, thus increasing the speed of feed motor 3.

It will be seen that unless both of the energized motors are taking less current than their respective ammeter contacts are set for, motor 25 will not act to speed up motor 3, since if any one of the three relays 51, 151, and 251 is deenergized, contactor 22 cannot be energized. Thus it will be seen that the speed of feed motor 3 will be decreased whenever any of the spindle motors is receiving more current than that for which its ammeter is adjusted, and that its speed will not be increased unless all of the spindle motors receiving current are taking less current than that for which their respective ammeters are adjusted.

By this means, I have arranged so that the feed is always that which will not overload any of the motors or of the cutters, and is always increased whenever all of the motors or cutters are underloaded.

It will be seen that in general, I have provided a means whereby the current input or the power input of each of a number of motors may be used to control jointly either the position of an object, such as the arm 26 of the rheostat, or the speed of a motor, such as motor 3.

Having described my invention, I wish to claim all those forms which fall within the scope of the appended claims:

1. In combination, a plurality of electric motors, a plurality of electrical instruments, one for each motor, each having a moving element adapted to be actuated by the current input of its associated motor, an auxiliary motor, means for controlling the speed of the auxiliary motor, a moveable member for actuating the means for controlling the speed of the auxiliary motor, a reversible power means adapted to move the moveable member, a first control means adapted to be energized by any of the moving elements and to energize the reversible power means for movement in one direction, and a second control means adapted to be actuated by the simultaneous action of all of the moving elements and to energize the reversible power means for movement in the other direction.

2. In combination, a plurality of spindle motors, a plurality of electrical instruments, one for each motor, each having a moving element adapted to be actuated by the power input of its associated motor, an auxiliary motor, controller means for controlling the speed of the auxiliary motor, reversible power means adapted to actuate the controller means, a first control means adapted to be energized by any of the moving elements and to energize the reversible power means for movement in one direction, a second control means adapted when energized to energize the reversible power means for movement in the other direction, and a plurality of relays, one adapted to be actuated by each of the moving elements, and having their contacts connected in series, for energizing the second control means.

3. In a milling machine, a plurality of spindle motors, an adjustable speed feed motor, a rheostat for controlling the speed of the feed motor, a reversible motor for operating the rheostat, a plurality of wattmeters, one for each spindle motor, each having a moving element to indicate the power input of its associated spindle motor, a plurality of moving contacts, one on the moving element of each wattmeter, a plurality of first adjustable contacts, one for each wattmeter, each adapted to be touched by its associated moving contact when the moving element is moved sufficiently by an increase in the power input of its spindle motor, a plurality of second adjustable contacts, one for each wattmeter, each adapted to be touched by its moving contact when the moving element is moved sufficiently by a reduction in the power input of its spindle motor, control means adapted to be energized from any of the first adjustable contacts when touched by its associated moving contact, for energizing the reversible motor in one direction, a plurality of relays, each adapted to be energized from its associated second adjustable contact when touched by its moving contact, and control means adapted to be energized when all of the relays are energized for energizing the reversible motor for movement in the other direction.

4. In combination, a plurality of electric motors, a plurality of electrical instruments, one for each motor, each having a moveable element adapted to be positioned by the power input of its motor, a plurality of first contacts, one for each moving element, each adapted to be energized by its moving element when the position of the moving element is changed by an increase in the power input of its motor, a plurality of second contacts, one for each moving element, each adapted to be energized by its moving element when the position of the moving element is changed by a decrease in the power input of its motor, control means adapted to be energized when any one of the first contacts is energized, and other control means adapted to be energized when all of the second contacts are energized.

5. In combination, an electrical motor, an electrical instrument having a moveable element adapted to be positioned by the power input of the motor, a first contact adapted to be energized by the moving element when the position of the moving element is changed by an increase in the power input of its motor, a first control means adapted to be energized when the first contact is energized, a second contact adapted to be energized by the moving element when the position of the moving element is changed by a decrease in the power input of the motor, a second control means adapted to be energized when the second contact is energized, and means for intermittently deenergizing the second control means while the second contact is energized.

6. In combination, a spindle motor, an electrical instrument having a moving element adapted to be actuated by the power input of the spindle motor, an auxiliary motor, controller means for controlling the speed of the auxiliary motor, reversible power means adapted to actuate the controller means, a first control means adapted to be energized by the moving element and to energize the reversible power means for movement in one direction, and a second control means adapted to be energized by the moving element and to energize the reversible power means intermittently for movement in the other direction.

7. In combination, an electric motor, an electrical instrument having a moving element adapted to be actuated by the current input of the motor, an auxiliary motor, means for controlling the speed of the auxiliary motor, a moveable member for actuating the means for controlling the speed of the auxiliary motor, a reversible power means adapted to move the moveable member, a first control means adapted to be energized by the moving element and to energize the reversible power means for rapid movement in one direction, and a second control means adapted to be actuated by the moving element and to energize the reversible power means for slow movement in the other direction.

8. In combination, a plurality of electrical motors, a plurality of moving elements one for each motor and each adapted to be actuated by the power input of its associated motor, an adjustable speed auxiliary motor, and means for speed adjustment adapted to be actuated by the moving elements and to adjust the speed of the auxiliary motor.

9. In combination, a plurality of electrical motors, a plurality of moving elements one for each motor and each adapted to be actuated by the power input of its associated motor, an adjustable speed auxiliary motor, and means for speed adjustment adapted to be actuated for decreasing the speed of the auxiliary motor when any one of the moving elements is moved to one limit by an increase in the power of its associated motor, and adapted to be actuated for increasing the speed of the auxiliary motor when all of the moving elements have been moved to the other limit by a decrease in the power input of their associated motors.

JOHN E. DORAN.